United States Patent Office 2,989,551
Patented June 20, 1961

2,989,551
NEW CYCLO-PREGNANES AND PROCESS FOR THEIR MANUFACTURE
Oskar Jeger, Zurich, Switzerland, assignor to Ciba Pharmaceutical Products Inc., Summit, N.J.
No Drawing. Filed May 6, 1959, Ser. No. 811,291
Claims priority, application Switzerland May 13, 1958
5 Claims. (Cl. 260—397.3)

This invention is based on the observation that 18:21-cyclo-pregnanes can be obtained by heating 21-diazo-20-oxo-pregnanes in the presence of a metal oxide. The process is represented by the following formulae

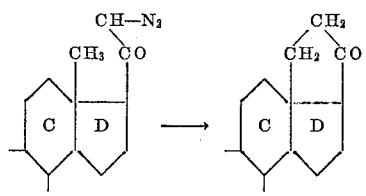

The new 18:21-cyclo-pregnanes which possess the Δ⁴-3-keto or Δ⁵-3-hydroxy-structure exhibit the same type of action as the corresponding known therapeutically useful pregnene compounds. Thus, 18:21-cyclo-progesterone has a progestative action. They can therefore be used with advantage as medicaments, instead of the known therapeutically useful pregnanes. Furthermore, the new compounds are useful as intermediate products for making medicaments. They also possess valuable physical properties, for example, the property of modifying the surface tension.

For bringing about ring closure in the process of this invention the 21-diazo-20-oxo-pregnane is dissolved in an inert organic solvent, such as a hydrocarbon, for example, toluene, xylene or chlorobenzene, or a solvent mixture, and the solution is heated in the presence of a metal oxide until the evolution of nitrogen ceases. An especially suitable metal oxide is cupric oxide. However, other metal oxides may be used such as iron oxide, cobalt oxide, nickel oxide, cadmium oxide or silver oxide, or a mixture of two or more oxides. The working up and isolation of the product from the reaction mixture is carried out by methods in themselves known, especially by extraction with an organic solvent followed by purification, by crystallization and/or chromatography.

The 21-diazo-20-oxo-pregnanes of the 5α- and 5β-series used as starting materials are known or can be made by methods in themselves known. In addition to the aforesaid substituents, the starting materials may contain further substituents such as free or functionally converted hydroxyl or oxo groups, halogen atoms, or alkyl groups such as methyl groups, for example, in positions 1, 2, 3, 4, 5, 6, 7, 8, 9, 11, 12, 14, 15, 16, 17 and 19. They may be saturated in the ring system or may contain double bonds therein, for example, in one or more of the positions 1, 4, 5, 9(11), 11, 14 and 16. Among functionally converted hydroxyl or oxo groups there are to be understood esterified or etherified hydroxyl groups or ketalized or enolized oxo groups or oximes, hydrazones or semicarbazones.

The products of the process which contain free hydroxyl and/or oxo groups may be converted by methods in themselves known into their functional derivatives, such as esters, ethers, enol-esters, enol ethers, acetals or the corresponding thio-derivatives, for examples, thio-ethers, thio-acetals and esters of thio-acids, and also hydrazones or oximes. In the esters and enol-esters the acid radicals may be those of saturated or unsaturated aliphatic or cycloaliphatic, or of aromatic or heterocyclic, mono- or di-carboxylic acids, sulfonic acids or those of phosphoric, sulfuric or hydrohalic acids. In the ethers, enol-ethers, acetals or corresponding thio-derivatives the radicals may be of the aliphatic, aromatic or heterocyclic series. Such radicals are, for example, alkyl or alkylene groups, such as benzyl groups or di- or tri-phenylmethyl groups, tetrahydropyranyloxy groups or sugar radicals such as those of glucose, galactose or maltose.

The present invention also provides substance mixtures for administration in human and veterinary medicine which mixtures contain the new compounds and a solid or liquid medicament carrier. The mixtures are prepared by conventional methods, for example using pharmaceutical organic or inorganic carrier materials suitable for parenteral, enteral or local administration. Such materials are concerned as do not react with the new compounds, as for example water, vegetable oils, benzyl alcohols, polyethylene glycols, gelatine, lactose, starch, magnesium stearate, talc, petroleum jelly, cholesterol or other medicament carriers. As preparations suitable especially for parenteral administration, solutions are preferably prepared, primarily oleaginous or aqueous solutions; suspensions, emulsions and implantates are also concerned; for enteral application tablets or dragees are also used and for local application also salves or creams. If desired, the preparations can be sterilized or auxiliary substances can be added, such as preserving, stabilizing, wetting or emulsifying agents, salts for variation of the osmotic pressure or buffer substances.

The following examples illustrate the invention:

*Example 1*

0.5 gram of finely pulverized cupric oxide is added to 0.5 gram of 21-diazo-20-oxo-5α-pregnane dissolved in 50 cc. of absolute toluene, and the mixture is heated under reflux for about 30 minutes until the splitting off of nitrogen ceases. The filtered solution is evaporated to dryness in vacuo, the residue is taken up in 100 cc. of a mixture of dioxane and water (10:1) and the solution is heated for one hour under reflux. The solvent is then evaporated in vacuo, and the residue is split up into a neutral fraction (0.43 gram) and an acid fraction (trace).

For the purpose of purification the neutral fraction is dissolved in 20 cc. of petroleum ether, and the solution is chromatographed through a column of 20 grams of neutral aluminum oxide of activity III. By means of a mixture of petroleum ether and benzene (4:1) a total of 0.1 gram of crystals are eluted from the column, which crystals are purified by sublimation under a high vacuum and crystallization from ether. The resulting pure 18:21-cyclo-20-oxoallopregnane melts at 178–180° C. and has the specific rotation $[\alpha]_D^{20}=+22.5°$ (chloroform). Its infrared absorption spectrum exhibits bands at 1727 cm.⁻¹ (chloroform).

100 milligrams of 18:21-cyclo-20-oxo-allopregnane are boiled under reflux with 200 milligrams of hydroxylamine hydrochloride and 300 milligrams of sodium acetate in 20 cc. of ethanol for 4 hours. After cooling the mixture, it is poured into water, and the oxime of 18:21-cyclo-20-oxo-allopregnane is isolated, and melts at 140–142° C. after crystallization from methanol.

By using Δ⁴-21-diazo-3:20-dioxo-pregnene as starting material in this example, there is obtained as final product 18:21-cyclo-progesterone.

In an analogous manner Δ⁵-18:21-cyclo-20-oxo-3β-acetoxy-pregnene is obtained by using Δ⁵-21-diazo-20-oxo-3β-acetoxy-pregnene as starting material.

Example 2

15 mg. of 18:21-cyclo-20-oxo-allopregnane are dissolved in 1 cc. of methylene chloride and 3 cc. of a 1% solution of 2:4-dinitrophenyl hydrazine in methanol are added. The solution is then heated for a short time on a water bath, evaporated under reduced pressure and allowed to stand for a few hours at room temperature. The derivative begins to separate. The product is then suctioned off and completely freed from methanol by taking it up in benzene and evaporating the benzene several times. The derivative is then dissolved in benzene and filtered through a small column of neutral aluminum oxide of activity II; the derivative which passes through the column as an orange ring can be easily separated from any impurities and is the 2:4-dinitrophenyl hydrozine of 18:21-cyclo-20-oxo-allopregnane. The resulting product is recrystallized from petroleum ether for the purpose of analysis and then dried for 24 hours in high vacuum. Melting point: 212–214° C.

Example 3

140 mg. of 18:21-cyclo-20-oxo-allopregnane are allowed to stand for 4 days with the exclusion of light with 3 cc. of freshly distilled benzaldehyde and 25 cc. of 1-N-ethanolic potassium hydroxide. After working up in the usual manner, 200 mg. of 18:21-cyclo-20-oxo-21-benzylidene-allopregnane in the form of a colorless crystalline mass are obtained. The product is crystallized three times from ester and then shows a melting point of 187–189° C. Ultraviolet spectrum absorption maximum: 297 m$\mu$, $\epsilon$ log=4.229.

200 mg. of 18:21-cyclo-20-oxo-21-benzylidene-allopregnane are dissolved in 5 cc. of ethyl acetate and 5 cc. of glacial acetic acid. Through the solution cooled to −15° C. an ozone-oxygen current is passed for 14 minutes (280 cc. per minute, about 27 mg. of ozone per minute). The operation is interrupted and, after adding 3 cc. of water and 1 cc. of hydrogen peroxide of 30% strength, the mixture is allowed to stand for 2 hours at 20° C. After a further addition of 1 cc. of hydrogen peroxide the whole is boiled under reflux for 1 hour. The hydrogen peroxide is then boiled with water and the solution worked up as usual. There are obtained 100 mg. of androstane-17:18-dicarboxylic acid. When recrystallized from ether the product melts at 212–214° C. For the purpose of analysis it is recrystallized from a mixture of chloroform and ether: Melting point, 212–214° C.; optical rotation $[\alpha]_D^{19}=+30.9$ (c.=0.780 in chloroform). pK=6.20 and 10.67. Equivalent weight: found 178, calculated 174.

50 mg. of the above dicarboxylic acid and 10 mg. of anhydrous sodium acetate are boiled under reflux in 4 cc. of acetic anhydride for 75 minutes. The solution is poured on to ice, taken up in ether, washed with water, dried over sodium sulfate, distilled off in vacuo and chromatographed through silica gel. 27 mg. of crystalline androstane-17:18-dicarboxylic acid anhydride are isolated with benzene which, when recrystallized from ether melt at 145–147° C. 10 mg. are recrystallized from ether; M.P. 149–150° C. Infrared absorption bands: 1810 cm.$^{-1}$ and 1757 cm.$^{-1}$. Optical rotation $$[\alpha]_D^{19}=+40.5$$

(c.=0.885 in chloroform).

What is claimed is:

1. $\Delta^5$-18:21-cyclo-20-oxo-3$\beta$-acetoxy-pregnene.
2. $\Delta^4$-18:21-cyclo-3:20-dioxo-pregnene.
3. Process for the manufacture of new 18:21-cyclopregnanes, wherein 21-diazo-20-oxo-pregnene which contains a double bond starting from carbon atom 5 and in 3-position a member of the group consisting of oxo and lower alkanoyloxy is heated in the presence of a metal oxide selected from the group consisting of cupric oxide, iron oxide, cobalt oxide, nickel oxide, cadmium oxide, silver oxide and mixtures thereof.
4. Process as claimed in claim 3, wherein cupric oxide is used as metal oxide.
5. 18:21-cyclo-20-oxo-pregnene which contains a double bond starting from carbon atom 5 and in 3-position a member of the group consisting of oxo and lower alkanoyloxy.

No references cited.